United States Patent
Pourbeyram et al.

(10) Patent No.: US 11,422,028 B2
(45) Date of Patent: Aug. 23, 2022

(54) SYSTEM AND METHOD FOR DETERMINING A PHOTON STATISTIC MEASUREMENT OF A PULSED LIGHT SOURCE USING AN UNBALANCED BEAMSPLITTER

(71) Applicant: UNM RAINFOREST INNOVATIONS, Albuquerque, NM (US)

(72) Inventors: Hamed Pourbeyram, Albuquerque, NM (US); Arash Mafi, Albuquerque, NM (US)

(*) Notice: Subject to any disclaimer, the term of this patent is extended or adjusted under 35 U.S.C. 154(b) by 0 days.

(21) Appl. No.: 17/288,361

(22) PCT Filed: Oct. 24, 2019

(86) PCT No.: PCT/US2019/057904
§ 371 (c)(1),
(2) Date: Apr. 23, 2021

(87) PCT Pub. No.: WO2020/086875
PCT Pub. Date: Apr. 30, 2020

(65) Prior Publication Data
US 2021/0381887 A1    Dec. 9, 2021

Related U.S. Application Data

(60) Provisional application No. 62/750,477, filed on Oct. 25, 2018.

(51) Int. Cl.
*G01J 1/44* (2006.01)
*G01J 1/04* (2006.01)
(52) U.S. Cl.
CPC .............. *G01J 1/44* (2013.01); *G01J 1/0429* (2013.01); *G01J 2001/442* (2013.01)

(58) Field of Classification Search
CPC ...... G01J 1/44; G01J 1/0429; G01J 2001/442; G01J 1/0414
See application file for complete search history.

(56) References Cited

U.S. PATENT DOCUMENTS

| 9,983,052 | B1* | 5/2018 | Brown | ...................... G01J 9/04 |
| 2009/0219960 | A1* | 9/2009 | Uberna | .............. G02B 19/0057 372/27 |

FOREIGN PATENT DOCUMENTS

| CN | 105136317 A | 12/2015 |
| RU | 47099 U1 | 8/2005 |
| SU | 989333 A1 | 1/1983 |

OTHER PUBLICATIONS

International Search Report and Written Opinion dated Dec. 19, 2019 in International Application No. PCT/US2019/057904, 6 pages.

\* cited by examiner

*Primary Examiner* — Thanh Luu
*Assistant Examiner* — Monica T Taba
(74) *Attorney, Agent, or Firm* — Mh2 Technology Law Group LLP (57) ABSTRACT

A method and system for determining a photon statistics of a light source using an unbalanced beam-splitter is disclosed. The method includes collecting data for photon counts for a first output path and a second output path by a first detector and a second detector, respectively, for a first time period, a first power level, and a first characteristic and collecting data for photon counts for the first output path and the second output path by the first detector and the second detector, respectively, for a second time period, a second power level, and a second characteristic; and processing outputs of the first and the second detector to determine the photon statistics.

16 Claims, 7 Drawing Sheets

SYSTEM AND METHOD FOR DETERMINING A PHOTON STATISTIC MEASUREMENT OF A PULSED LIGHT SOURCE USING AN UNBALANCED BEAMSPLITTER

CROSS REFERENCE TO RELATED APPLICATIONS

This application is a U.S. National Phase application of PCT/US2019/057904 filed Oct. 24, 2019, which claims benefit of priority to U.S. provisional application 62/750,477 filed on Oct. 25, 2018, the entireties of which are incorporated herein by reference.

FIELD

The present teachings generally relate to pulsed light sources, and more particularly to a system and method for determining a photon statistic measurement of a pulsed light source using an unbalanced beamsplitter.

BACKGROUND

As research in quantum information science and technology continues to grow, so does the demand to accurately determine the photon statistics of light sources. In order to do so, one would generally measure the second degree of coherence ($g^{(2)}$) of the light source. This is done by passing the light through a 50:50 (balanced) beam-splitter and recording individual counts for each path of the beam-splitter as well as counting coincidences between the two. Measuring the coincidences is an elaborate process and requires extreme care to handle the errors and uncertainties due to the optics and electronics involved in such experiments.

What is needed is an improved system and method for determining a photon statistic measurement of a pulsed light source that addresses the above-noted issues.

SUMMARY

In accordance with examples of the present disclosure, a method for determining a photon statistics of a light source using an unbalanced beam-splitter is provided. The method comprises directing a laser beam from a laser to a half-wave plate and to 50:50 beam-splitter, where a first output path of the 50:50 beam-splitter is transmitted to a first detector and a second output path passes through a linear polarizer to introduce an intentional loss to a second detector; setting a first power level for the laser; setting a first characteristic of the linear polarizer to produce a first characteristic loss; collecting data for photon counts for the first output path and the second output path by the first detector and the second detector, respectively, for a first time period, the first power level, and the first characteristic; setting a second power level for the laser; setting a second characteristic of the linear polarizer to produce a second characteristic loss; collecting data for photon counts for the first output path and the second output path by the first detector and the second detector, respectively, for a second time period, the second power level, and the second characteristic; processing, by a field programmable gate array, outputs of the first and the second detector to determine the photon statistics.

In some examples, the method comprises synchronizing the laser, the first detector, and the second detector using the field programmable gate array. In some examples, the first power level is lower than the second power level. In some examples, the first characteristic loss is less than the second characteristic loss. In some examples, the first time period is the same as the second time period. In some examples, the first time period is based on a characteristic of the laser. In some examples, the characteristic of the laser is a pulse duration. In some examples, the power level and the characteristic of the linear polarizer are repeatedly changed and resultant radiation for the first output path and the second output path collected and processed.

In accordance with examples of the present disclosure, a system for determining a photon statistics of a light source using an unbalanced beam-splitter is provided. The system comprises a laser configured to produce a laser beam; a half-wave plate configured to receive the laser beam from the laser; a 50:50 beam-splitter configure to produce a first output path and a second output path; a first detector configured to receive the first output path; a linear polarizer configured to introduce an intentional loss in the second output path; a second detector configured to receive the second output path after passing through the linear polarizer, wherein the first detector and the second detector are configured to collect data for photon counts for the first output path and the second output path, respectively, for a first time period, the first power level, and the first characteristic; and a field programmable gate array configured to process outputs of the first and the second detector to determine the photon statistics.

In some examples, the system the laser, the first detector, and the second detector are synchronized using the field programmable gate array. In some examples, the first power level is lower than the second power level. In some examples, the first characteristic loss is less than the second characteristic loss. In some examples, the first time period is the same as the second time period. In some examples, the first time period is based on a characteristic of the laser. In some examples, the characteristic of the laser is a pulse duration. In some examples, the power level and the characteristic of the linear polarizer are repeatedly changed and resultant radiation for the first output path and the second output path collected and processed.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

As research in quantum information science and technology continues to grow, so does the demand to accurately determine the photon statistics of light sources. In order to do so, one would generally measure the second degree of coherence ($g^{(2)}$) of the light source. This is done by passing the light through a 50:50 (balanced) beam-splitter and recording individual counts for each path of the beam-splitter as well as counting coincidences between the two. Measuring the coincidences is an elaborate process and requires extreme care to handle the errors and uncertainties due to the optics and electronics involved in such experiments.

A framework to determine the photon statistics using an alternative and potentially simpler method is provided. The present framework relies on using an asymmetric beamsplitter and possibly introducing intentional asymmetrical losses in the non-photon-number resolving detection system. It is observed that the counts from one arm of the beam-splitter, when plotted as a function of the counts from the other arm, follow universal single-parameter curves that hint to the statistics of the photon source.

Figure 1:
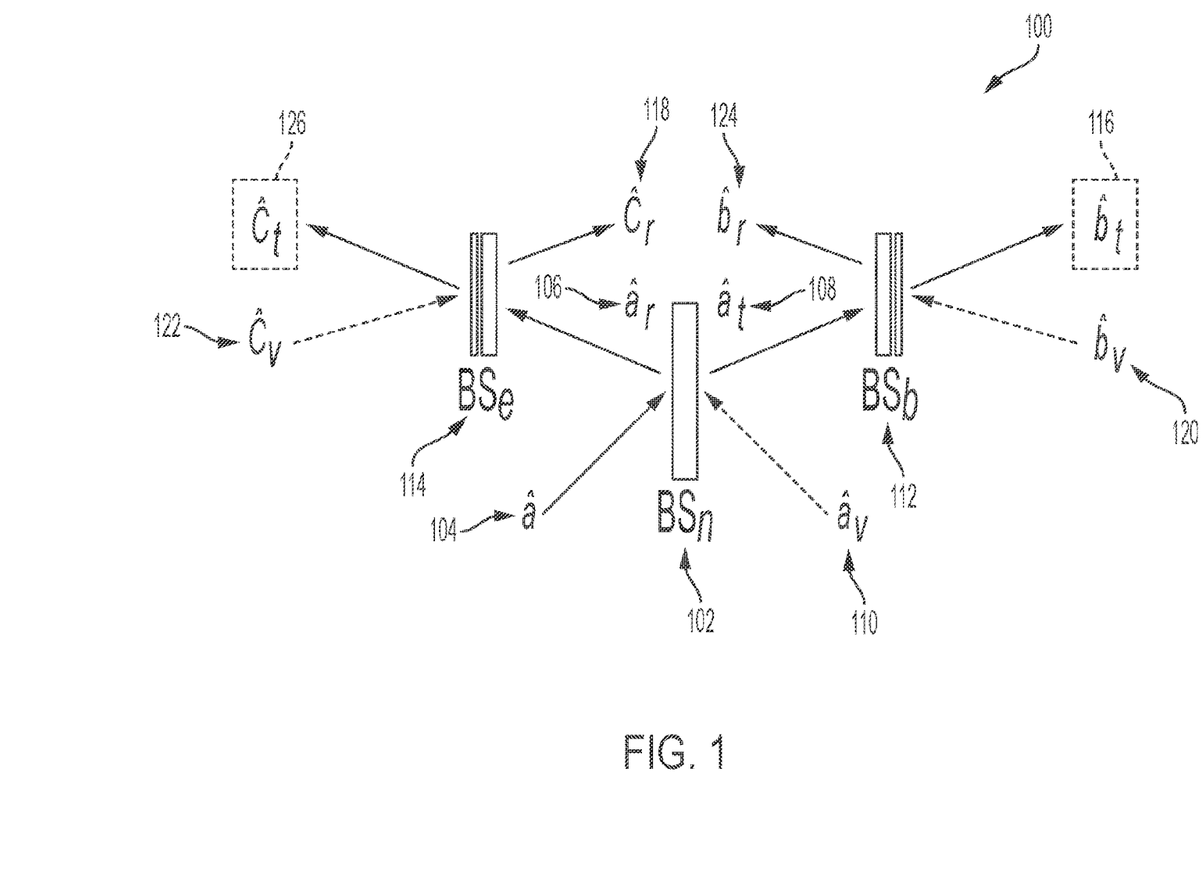
FIG. 1 shows a conceptual framework of the experiment: the light source is coupled in port $\hat{a}$ of the beam-splitter $BS_a$. The reflected and transmitted photons from $BS_a$ appear in ports $\hat{a}_6$ and $\hat{a}_t$, respectively. $\hat{a}_v$ signifies the unused port (vacuum).

FIG. 1 shows a system 100 for determining photon statistics, according to examples of the present disclosure. A light source is coupled in port $\hat{a}$ 104 of beam-splitter $BS_a$ 102. The reflected and transmitted photons from $BS_a$ 102 appear in ports $\hat{a}_r$ 106 and $\hat{a}_t$ 108 respectively. $\hat{a}_v$ 110 signifies the unused port (vacuum) and the associated photon operator, which is required to preserve unitarity. The present method can be carried out with only $BS_a$ 102 and counting the photons in ports $\hat{a}_r$ 106 and $\hat{a}_t$ 108. However, in practice, there may be losses associated with each arm, e.g. when coupling to the photon detectors. Such losses are modeled with two additional beam-splitters, one on each arm: $BS_b$ 112 and $BS_c$ 114. Therefore, in an actual experiment $BS_a$ 102 is the only physical beam-splitter, while $BS_b$ 112 and $BS_c$ 114 are only used (in theory) to model the losses of photons associated with detections from ports $\hat{a}_t$ 108 and $\hat{a}_r$ 106. The non-photon-number resolving detectors are coupled to $\hat{b}_t$ port 116 and $\hat{c}_t$ port 118. $\hat{b}_v$ port 120 and $\hat{c}_v$ port 122 are empty vacuum ports, and $\hat{b}_r$ port 124 and $\hat{c}_r$ port 126 represent the losses in their corresponding arms.

Each beam-splitter, e.g., $BS_a$ 102 $BS_b$ 112, and $BS_c$ 114, is associated with a pair of amplitude transmission and reflection coefficients: $t_a$ and $r_a$ for $BS_a$ 102, $t_b$ and $r_b$ for $BS_b$ 112, and $t_c$ and $r_c$ for $BS_c$ 114. All the operators indicated in FIG. 1 are proper conventional photon (annihilation) operators and satisfy the appropriate commutation relationships, for example, $[\hat{a}, \hat{a}_t^\dagger+]=1$ and $[\hat{c}_v, \hat{c}_v^\dagger+]=1$.

The input-output relations for the dielectric beam-splitter $BS_a$ 102 can be expressed as:

$$\begin{bmatrix} a_r \\ a_t \end{bmatrix} = \begin{bmatrix} t_a & -ir_a \\ -ir_a & t_a \end{bmatrix} \begin{bmatrix} a_v \\ a \end{bmatrix} \qquad (1)$$

Here, without the loss of generality it is assumed that $t_a$ and $r_a$ are real. Conservation of energy (reciprocity) implies that $T_a+R_a=1$, where $T_a=t_a^2$ and $R_a=r_a^2$ are the intensity transmission and reflection coefficients, respectively. Similar input-output relations can be written for $BS_a$ 102 and $BS_b$ 112 and their associated ports. Using these relations for all beam-splitters, it can be readily shown that $$\hat{a}=ir_a(t_c\hat{c}_r+ir_c\hat{c}_r)+t_a(ir_b\hat{b}_r+t_b\hat{b}_t) \qquad (2)$$

In the present disclosure, the differentiation between coherent and thermal light sources and photon number states are provided. As such, it is assumed that the input beam in port $\hat{a}$ is represented by a density matrix of the form $$\hat{\rho} = \sum_{n=0}^{\infty} P_n |n; a\rangle\langle n; a| = \sum_{n=0}^{\infty} \frac{P_n}{n!}(\hat{a}^\dagger)^n |0; a\rangle\langle 0; a|(\hat{a})^n \qquad (3)$$

where $|n;a\rangle$ is the photon number state in port $\hat{a}$ with n photons. $P_n$ for coherent and thermal sources is given by $$P_n^{(coherent)} = \exp(-\bar{n})\frac{\bar{n}^n}{n!}, \qquad (4)$$

$$P_n^{(thermal)} = \frac{1}{1+\bar{n}}\left(\frac{\bar{n}}{1+\bar{n}}\right)^n$$

where $\bar{n}$ represents the mean photon number is each case.

Because it is assumed that the detectors are non-photon-number resolving, the probability of detecting at least one photon in port $\hat{b}_t(P_b^s)$ can be calculated as one minus the probability that no photon is detected in port $\hat{b}_t(P_b^v)$. The superscripts s and v indicate detecting a signal or vacuum, respectively. Therefore, $P_b^s=1-P_b^v$ and $P_b^v$ can be calculated as $$P_b^v = Tr_{b_r,c_r,c_t}[\langle 0; b_t|\hat{\rho}|0; b_t\rangle] \qquad (5)$$

where the trace operation is performed on ports $\hat{b}_r$, $\hat{c}_r$, and $\hat{c}_t$ over the reduced density matrix projected onto the vacuum state in port $\hat{b}_t$. PI can be calculated by substituting Eqs. 2 and 3 in Eq. 5 and using a trinomial expansion. The following is then obtained $$P_b^v = \sum_{n,p,q,s=0}^{\infty} P_n \frac{n!\delta_{p+q+s,n}}{p!q!s!}(T_aR_b)^p(R_aR_c)^q(R_aT_c)^s \qquad (6)$$

Equation 4 is then substituted in Eq. 6 and the sums can be performed to obtain the following:

coherent: $P_b^v = \exp(-\bar{n}T_aT_b)$, \qquad (7)

$P_c^v = \exp(-\bar{n}R_aT_c)$ thermal: $P_b^v = \dfrac{1}{1+\bar{n}T_aT_b}$, \qquad (8)

$P_c^v = \dfrac{1}{1+\bar{n}R_aT_c}$

Of course, the probability of detecting a signal (at least one photon) in each port is one minus the probabilities shown in Eqs. 7, and 8. $\bar{n}$ can next be eliminated and the following relations found:

$$\text{coherent: } P_c^s = 1 - (1 - P_b^s)^{1/\beta} \quad (9)$$

$$\text{thermal: } P_c^s = \frac{P_s^s}{\beta + (1-\beta)P_b^s} \quad (10)$$

$$\beta = \frac{T_a T_b}{R_a T_c} \quad (11)$$

where $\beta$ is the parameter that characterizes the imbalance between the beam-splitter $\beta$ output ports, including possible losses.

In experiment, it is straightforward to determine $T_a$ and $R_a$, because they represent the imbalance of the typically lossless beam-splitter used in a photon-counting experiment. However, $T_b$ and $T_c$ parameterize the losses and depend on the coupling efficiencies to the detectors as well as the detection efficiencies of the detectors at the given wavelength. Fortunately, neither these parameters, nor $\beta$ are strictly required to determine whether a light source is coherent or thermal. What is important is that Eqs. 9 and 10 are universal single-parameter curves with only one free parameter $\beta$: in the following, the signal rate is measured in port $\hat{c}_r$ versus the signal rate $\hat{b}_r$, using non-photon-counting detectors, and fit the measured data to Eqs. 9 and 10. It will be shown that in an unbalanced system where $\beta \neq 1$ the goodness of the fit can clearly favor one to another. It is notable that the limit of $\beta = 1$ for the balanced detector results in linear curves of the form $P_c^s = P_b^s$ for both coherent and thermal sources; therefore, the imbalance is critical to distinguishing between coherent and thermal sources.

Figure 2:
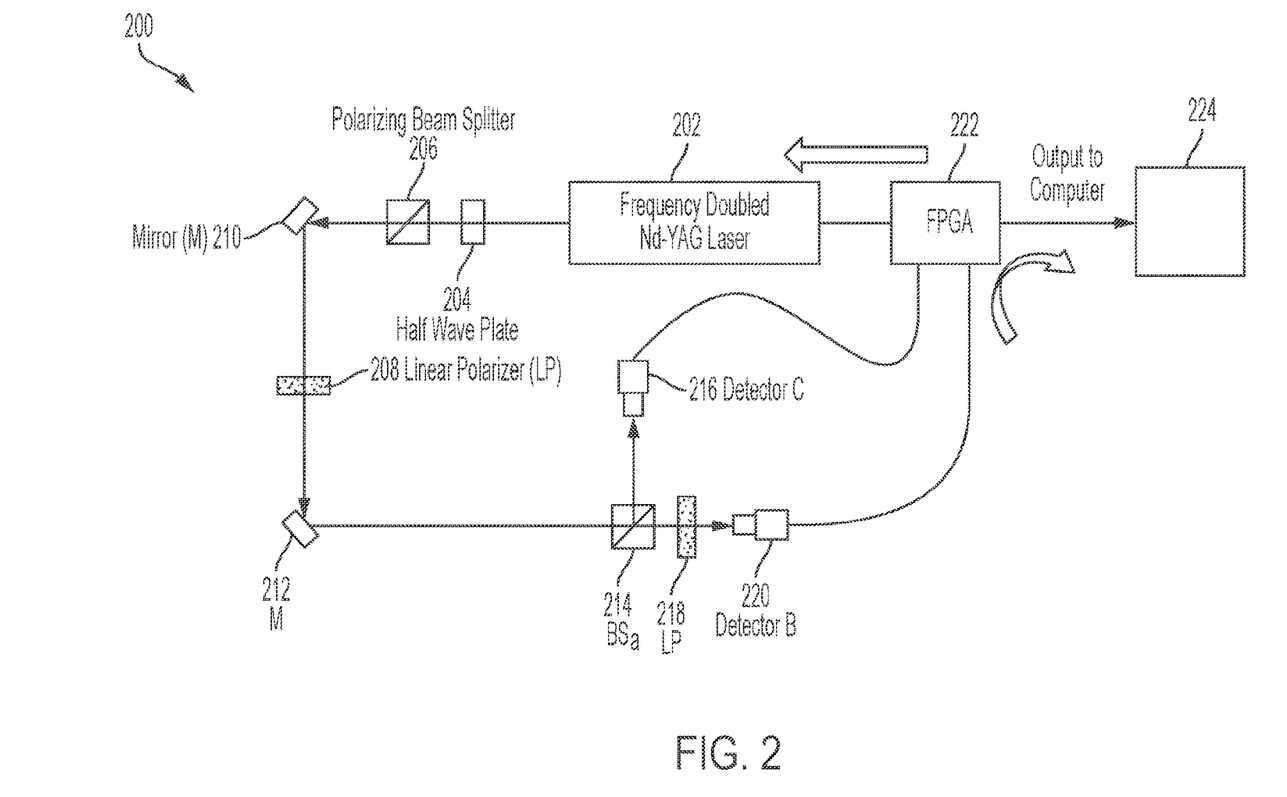
FIG. 2 shows a schematic of the experiment: the input power of the laser light is controlled by using a half-wave plate, a polarizing beam-splitter, and a linear polarizer. The attenuated laser then enters a 50:50 beam-splitter ($BS_a$). One output path of the beam-splitter goes directly to detector C (Path C), while the other path passes through another LP to introduce an intentional loss and is then collected by detector B (Path B). The pulses from photodiodes are processed by the Field Programmable Gate Array (FPGA), which also synchronizes the laser and the detectors.

FIG. 2 shows a system 200 for determining photon statistics without coincidence counting using an unbalanced beamsplitter, according to examples of the present disclosure. Laser 202 is used as a coherent light source in an unbalanced beam-splitter setting. For example, laser 202 can be a 532 nm frequency-doubled Nd:YAG with a 0.5 ns pulse duration and a 1 kHz repetition rate. The input power of laser 202 is controlled by half-wave plate 204, a polarizing beamsplitter 206, and first linear polarizer (LP) 208 and directed by first mirror 210 and second mirror 212. The attenuated laser then enters a 50:50 beam-splitter (BS$_a$) 214. One output path of BS$_a$ 214, the path associated with $\hat{c}_r$, is directed to detector C 216 (Path C), while the other path (Path B associated with $\hat{b}_r$) pass through second LP 218 to introduce an intentional loss by creating an unbalanced setup with $\beta<1$, and is then collected by detector B 220. Each detector, e.g., detector B 220 and detector C 216, is a conventional non-photon-number resolving single photon counting module (SPCM). When one or more photons arrived at the SPCM, the embedded silicon avalanche photodiode sends a 25 ns electric pulse that is processed by FPGA board 222 and output to computer 224 and processed using a LabVIEW code or other suitable software based on the procedure explained in J. J. Thorn, M. S. Neel, V. W. Donato, G. S. Bergreen, R. E. Davies, and M. Beck, Observing the quantum behavior of light in an undergraduate laboratory," Am. J. Phys. 72, 1210-1219 (2004) and M. Beck, Quantum Mechanics: Theory and Experiment (OUP USA, 2012).

An important characteristic of the avalanche photodiodes is the deadtime, which is the short time delay between one photon detection and the next one [18]. This delay occurs because time is needed to reset the circuit so it is ready for the next photon. For the detectors used in the present experiments, the typical deadtime was about 50 ns.

Figure 3:
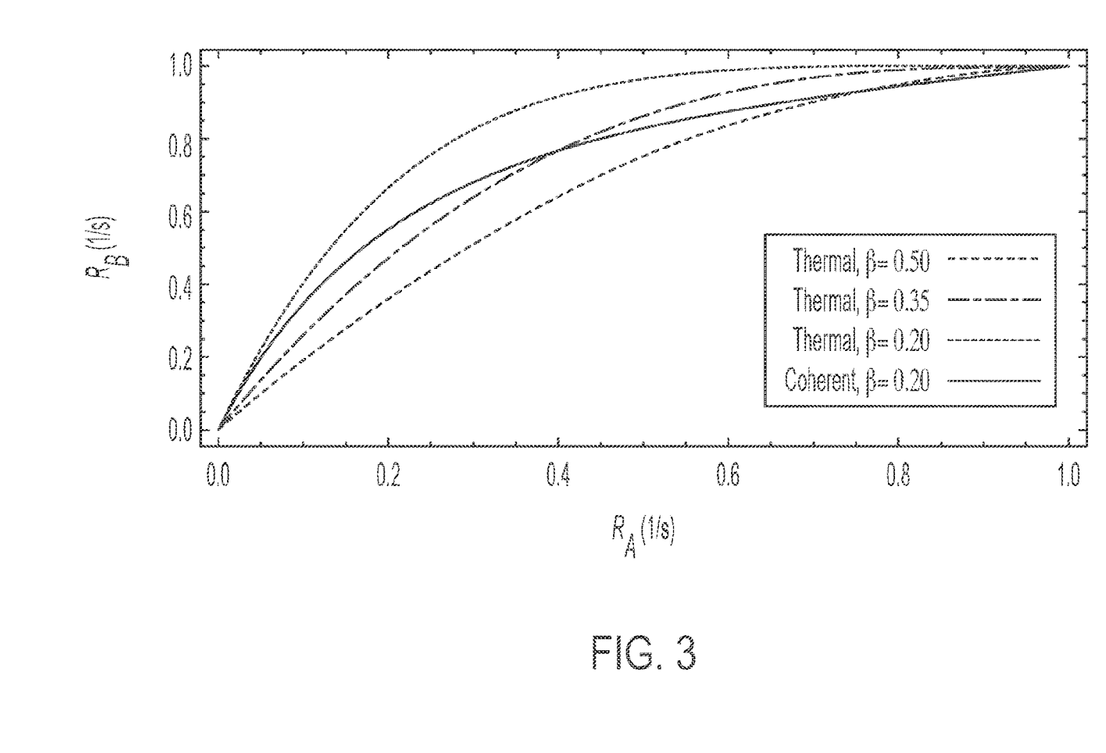
FIG. 3 shows a theoretical calculation of comparison between thermal and coherent states for different values of imbalance corresponding to different values of β indicating the distinct statistics for thermal and coherent states as it being demonstrated in Eqs. 9 and 10.

FIG. 3 shows a theoretical calculation of comparison between thermal and coherent states for different values of imbalance corresponding to different values of $\beta$ indicating the distinct statistics for thermal and coherent states as it being demonstrated in Eqs. 9 and 10.

Considering the deadtime of approximately 50 ns and the pulse duration of only 0.5 ns, at most one signal from each laser pulse was detected in the present experiment (ignoring after-pulsing), and the maximum count rate equaled the repetition-rate of the laser, i.e. a maximum of 1000 counts per second. It was observed that ambient noise was approximately 500 counts per second, which was equal to half of the maximum number of signal counts at full saturation in the present setup. In order to address this issue, the laser and detector systems were synchronized through the FPGA and implemented a selection window (SW) within the detector system to reduce the total noise. Having the laser pulses synchronized with the internal clock of the FPGA allowed us to know exactly when the laser pulses (signal) arrived at the SPCM. To remove the dark counts from the present experimental data, a SW was implemented such that, when closed, it ignored all detection signal counts coming from the SPCM that were known to be noise. Considering the 470 ns jitter time of the laser, a 20 μs SW was implemented to ensure that every laser pulse was being captured. Adding the SW resulted in an overall 50-fold reduction of the noise in the system; the dark counts dropped from 500 counts per second to less than 10 counts per second, making the present experiment feasible.

Figure 4:
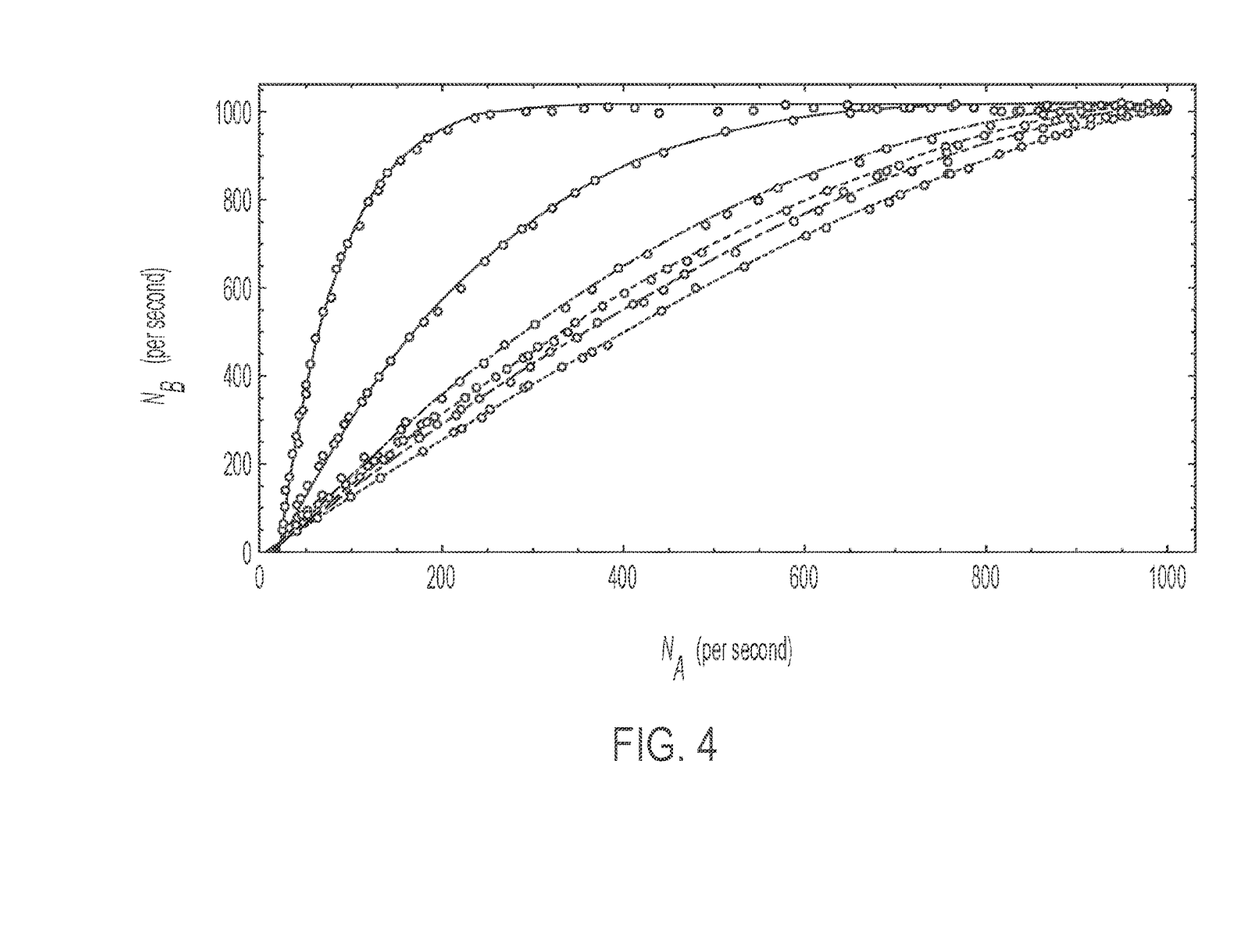
FIG. 4 shows a plot of experimental results (dots) vs. theoretical prediction (solid lines) of the photon counts in an unbalanced beamsplitter using a laser beam as a coherent light source. $N_A$ and $N_B$ indicate number of photons per second detected in arm A and arm B, where a loss is introduced in arm A. Different plots show various arbitrary losses introduced in each set of the experiments.

FIG. 4 shows a plot of experimental results (dots) vs. theoretical prediction (solid lines) of the photon counts in an unbalanced beamsplitter using a laser beam as a coherent light source. $N_A$ and $N_B$ indicate number of photons per second detected in arm A and arm B, where a loss is introduced in arm A. Different plots show various arbitrary losses introduced in each set of the experiments.

Measurements were started by setting the laser to its lowest power and adjusted the LP in Path B for minimal loss. Data was then collected for photon counts from both paths for one minute. The input laser power was then increased to the beam-splitter slightly and collected new data for another minute. This procedure was repeated in incremental steps in input laser power, until the full range from near-zero counts in either detectors was covered to the fully saturated counts (1000 counts per second) in both detectors. The series of steps mentioned so far related to a single value of β. In order to change the value of β, the loss to Path B was increased by rotating the corresponding LP by 20 degrees. The input laser light was then readjusted back to the minimum power and followed the above procedure to sweep the full range of powers until reaching saturation at 1000 counts per second. This whole procedure was then repeated for different values of β, each using an increment of 20 degrees rotation in the LP in Path B. The counts collected at each power level were then divided by 60,000 (1000 counts per second over one minute) to represent $P_c^s$ (Path C) and $P_b^s$ (Path B) and then plotted in FIG. 3. Each data point FIG. 3 represents a ($P_b^s, P_c^s$) pair, while each color represents a different value for the LP angle in Path B (different 6 values). 20 counts per second were subtracted from each arm, equivalent of subtracting 0.02 in each axis in FIG. 5, in order to subtract the background noise count, which appeared to persist in all the present measurements. The measured data in each set corresponding to a fixed value of β have been fitted to Eq. 9, and the agreement appears to be excellent in each case. The fitted curves are plotted over the data points in each case in FIG. 5.

Figure 5:
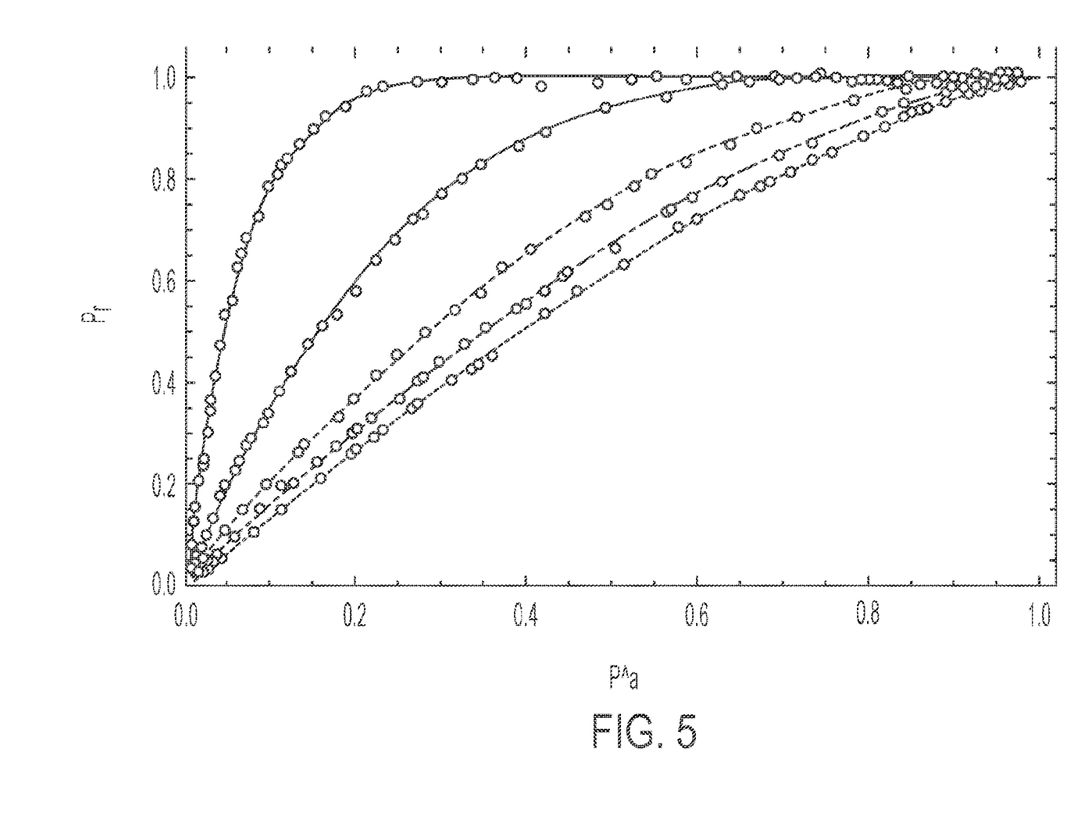
FIG. 5 shows a plot of measured data (dots) versus theoretical fits to Eq. 9 (solid lines) in an unbalanced beam-splitter using a laser beam as the coherent light source. Different colors show different values of imbalance corresponding to different values of β.
Figure 6:
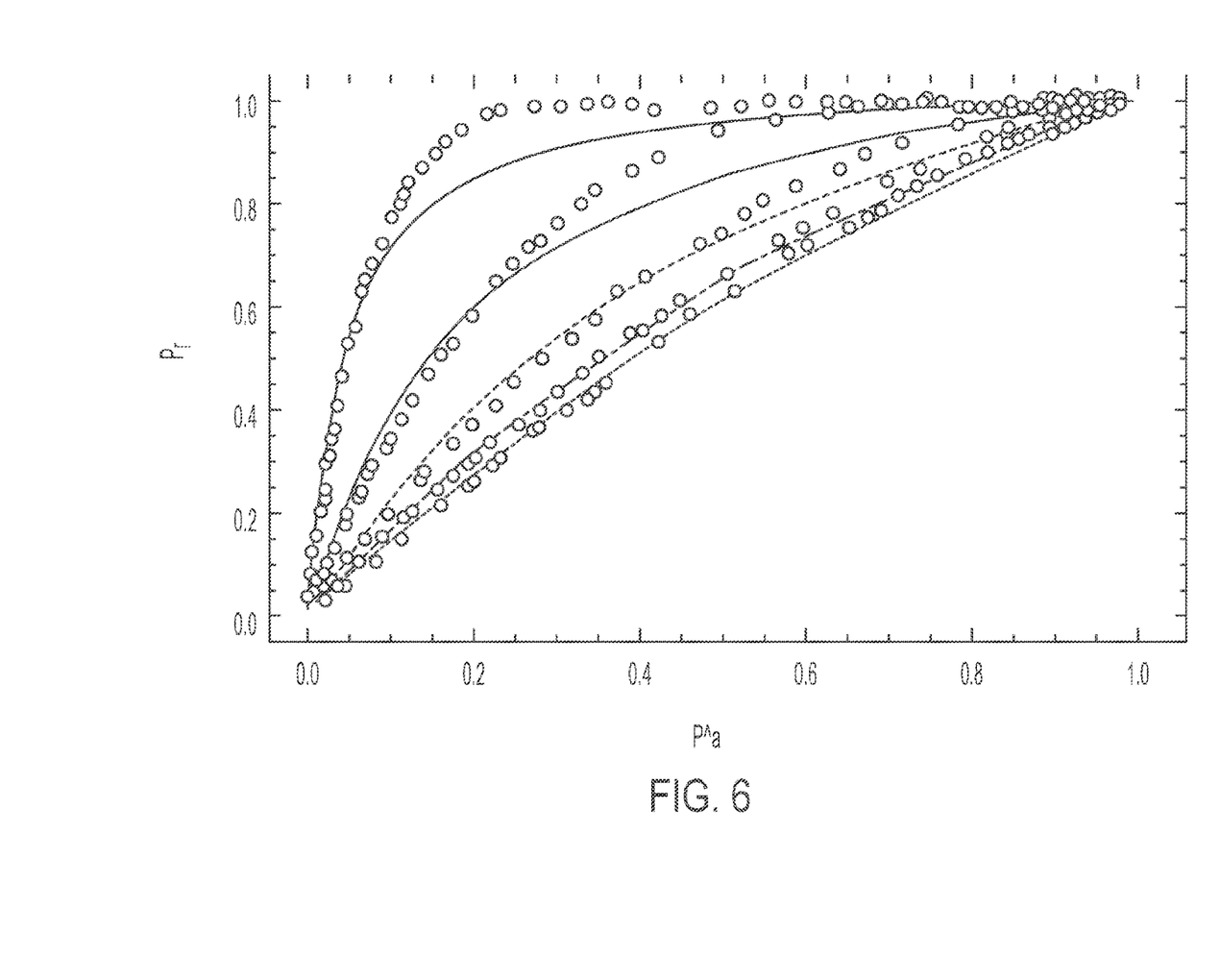
FIG. 6 is similar to FIG. 5 except the solid lines represent best fits using Eq. 10 for thermal light. The low quality of fits clearly indicates that the source is not thermal.

It is now interesting to see how well the measured data can be fitted to Eq. 10 for a thermal source. In FIG. 6, the results for fitting to the same experimental data shown in FIG. 5 are shown using the nonlinear fitting algorithm in Mathematica. It is clear that the more unbalanced the setup, the worse the fit is. The data clearly shows that the source is not thermal and the measurements do not follow the universal form of Eq. 10.

Figure 7:
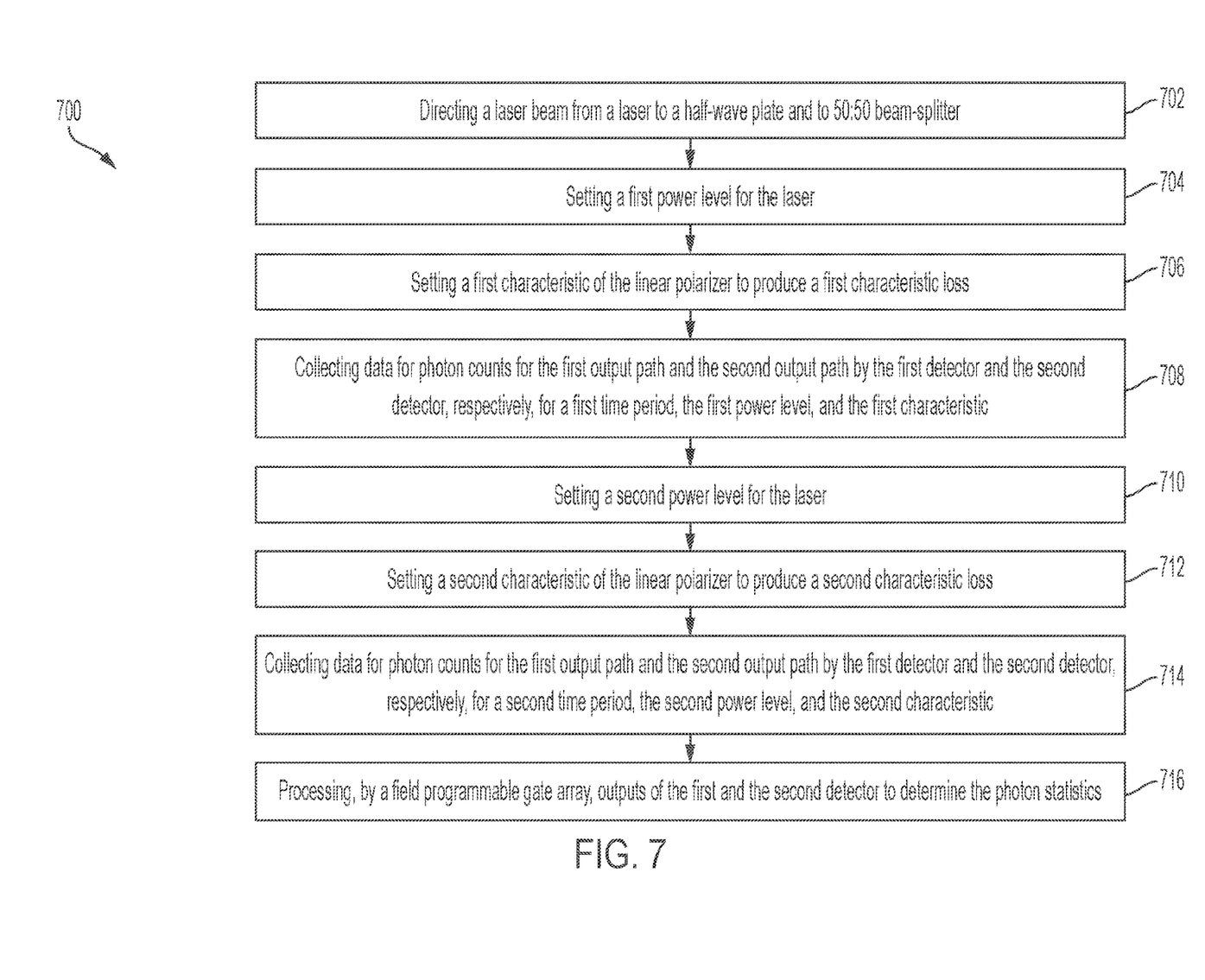
FIG. 7 shows a method for determining a photon statistics of a light source using a beam-splitter, according to examples of the present disclosure.

FIG. 7 shows a method 700 for determining a photon statistics of a light source using a beam-splitter, according to examples of the present disclosure. The method 700 comprising directing, at 702, a laser beam from a laser to a half-wave plate and to 50:50 beam-splitter. A first output path of the 50:50 beam-splitter is transmitted to a first detector and a second output path passes through a linear polarizer to introduce an intentional loss to a second detector. The method 700 continues by setting, at 704, a first power level for the laser. The method 700 continues by setting, at 706, a first characteristic of the linear polarizer to produce a first characteristic loss. The method 700 continues by collecting, at 708, data for photon counts for the first output path and the second output path by the first detector and the second detector, respectively, for a first time period, the first power level, and the first characteristic. The method 700 continues by setting, at 710, a second power level for the laser. For example, the first power level can be lower than the second power level. The method 700 continues by setting, at 712, a second characteristic of the linear polarizer to produce a second characteristic loss. For example, the first characteristic loss can be less than the second characteristic loss. The method 700 continues by collecting data, at 714, for photon counts for the first output path and the second output path by the first detector and the second detector, respectively, for a second time period, the second power level, and the second characteristic. For example the first time period can be the same as the second time period. For example, the first time period can be based on a characteristic of the laser. For example, the characteristics of the laser can be a pulse duration of the laser. The method 700 continues by processing, at 716, by a field programmable gate array, which is connected to the first and the second detector, and processes the outputs of the first and the second detector to detect and count the photons to determine the photon statistics. In some examples, the method 700 can comprise synchronizing the laser, the first detector, and the second detector using the field programmable gate array. In some examples, the power level and the characteristic of the linear polarizer are repeatedly changed and resultant radiation for the first output path and the second output path collected and processed.

As discussed above, the sources that have been discussed above are coherent (with Poissonian statistics) and thermal (with super-Poissonian statistics), which are both classical. It is possible to follow the same procedure for sub-Poissonian quantum sources of light. For example, for the photon-number state |s>, $P_n = \delta_{n,\bar{n}}$, where $\bar{n}$ is equal to the number of photons (and obviously the average number of photons). This form of Pn can be used following the same procedure outlined above to obtain the universal curve $P_c^s = P_b^s / \beta$, where $\beta$ is defined in Eq. 11. Therefore, for the photon-number state the $P_c^s$ versus $P_b^s$ always follows a straight line with slope $1/\beta$, regardless of the size of imbalance. The present experimental data clearly shows a significant curvature and is not a sub-Poissonian number state.

In order to decide in an experiment whether a source is thermal, coherent, or a number state using the above procedure, one needs to rely on a metric based on the goodness of the fit in an unbalanced setup. For more general sources where a closed form expression may not be available, it will be interesting to devise a single-number metric akin to the second degree of coherence ($g^{(2)}$). A concrete connection between the results in this paper and $g^{(2)}$ is yet to be made. Such a single-number metric can possibly be constructed using the curvature of the $P_c^s - P_b^s$ curve to determine the quantumness or classicality of the source.

Finally, complications due to pulse overlaps from the detectors were conveniently avoided because a low repetition-rate pulsed source was used with a duration substantially shorter than the deadtime of the detectors. If this technique is to be applied to CW sources, issues such as the large dark-count and pulse overlaps need to be carefully considered for the proper interpretation of the measured data. Another important point is that measurements for thermal sources have not been presented. The main reason was the lack of access to an appropriate thermal source that could be readily used in the present procedure. As such, testing the present procedure with a thermal source will be postponed to future efforts, possibly using a rotating ground glass to generate pseudo-thermal light.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for determining a photon statistics of a light source using an unbalanced beam-splitter, the method comprising:
   directing a laser beam from a laser to a half-wave plate and to 50:50 beam-splitter, where a first output path of the 50:50 beam-splitter is transmitted to a first detector and a second output path passes through a linear polarizer to introduce an intentional loss to a second detector;
   setting a first power level for the laser;
   setting a first characteristic of the linear polarizer to produce a first characteristic loss;
   collecting first data for photon counts for the first output path and the second output path by the first detector and the second detector, respectively, for a first time period, the first power level, and the first characteristic;
   setting a second power level for the laser;
   setting a second characteristic of the linear polarizer to produce a second characteristic loss;
   collecting second data for photon counts for the first output path and the second output path by the first detector and the second detector, respectively, for a second time period, the second power level, and the second characteristic; and
   processing, by a field programmable gate array, outputs of the first detector and the second detector to determine the photon statistics.

2. The method of claim 1, further comprising synchronizing the laser, the first detector, and the second detector using the field programmable gate array.

3. The method of claim 1, wherein the first power level is lower than the second power level.

4. The method of claim 1, wherein the first characteristic loss is less than the second characteristic loss.

5. The method of claim 1, wherein the first time period is the same as the second time period.

6. The method of claim 1, wherein the first time period is based on a characteristic of the laser.

7. The method of claim 6, wherein the characteristic of the laser is a pulse duration.

8. The method of claim 1, power level and characteristics of the linear polarizer are repeatedly changed and resultant radiation for the first output path and the second output path collected and processed.

9. A system for determining a photon statistics of a light source using an unbalanced beam-splitter, the system comprising:
   a laser configured to produce a laser beam;
   a half-wave plate configured to receive the laser beam from the laser;
   a 50:50 beam-splitter configure to produce a first output path and a second output path;
   a first detector configured to receive the first output path;
   a linear polarizer configured to introduce an intentional loss in the second output path;
   a second detector configured to receive the second output path after passing through the linear polarizer, wherein the first detector and the second detector are configured to collect data for photon counts for the first output path and the second output path, respectively, for a first time period, a first power level, and a first characteristic; and
   a field programmable gate array configured to process outputs of the first and the second detector to determine the photon statistics.

10. The system of claim 9, wherein the laser, the first detector, and the second detector are synchronized using the field programmable gate array.

11. The system of claim 9, wherein the first power level is lower than a second power level.

12. The system of claim 9, wherein a first characteristic loss is less than a second characteristic loss.

13. The system of claim 9, wherein the first time period is the same as the second time period.

14. The system of claim 9, wherein the first time period is based on a characteristic of the laser.

15. The system of claim 14, wherein the characteristic of the laser is a pulse duration.

16. The system of claim 9, the power level and the characteristic of the linear polarizer are repeatedly changed and resultant radiation for the first output path and the second output path collected and processed.

* * * * *